April 22, 1958  E. P. WIGNER  2,831,806
NEUTRONIC REACTOR
Filed Oct. 14, 1952
8 Sheets-Sheet 1

INVENTOR.
Eugene P. Wigner
BY
Roland A. Anderson
Attorney

April 22, 1958 — E. P. WIGNER — 2,831,806
NEUTRONIC REACTOR
Filed Oct. 14, 1952 — 8 Sheets-Sheet 2

INVENTOR.
Eugene P. Wigner
BY
Roland A. Anderson
Attorney

April 22, 1958     E. P. WIGNER     2,831,806
NEUTRONIC REACTOR

Filed Oct. 14, 1952     8 Sheets-Sheet 3

INVENTOR.
Eugene P. Wigner
BY
Roland A. Anderson
Attorney

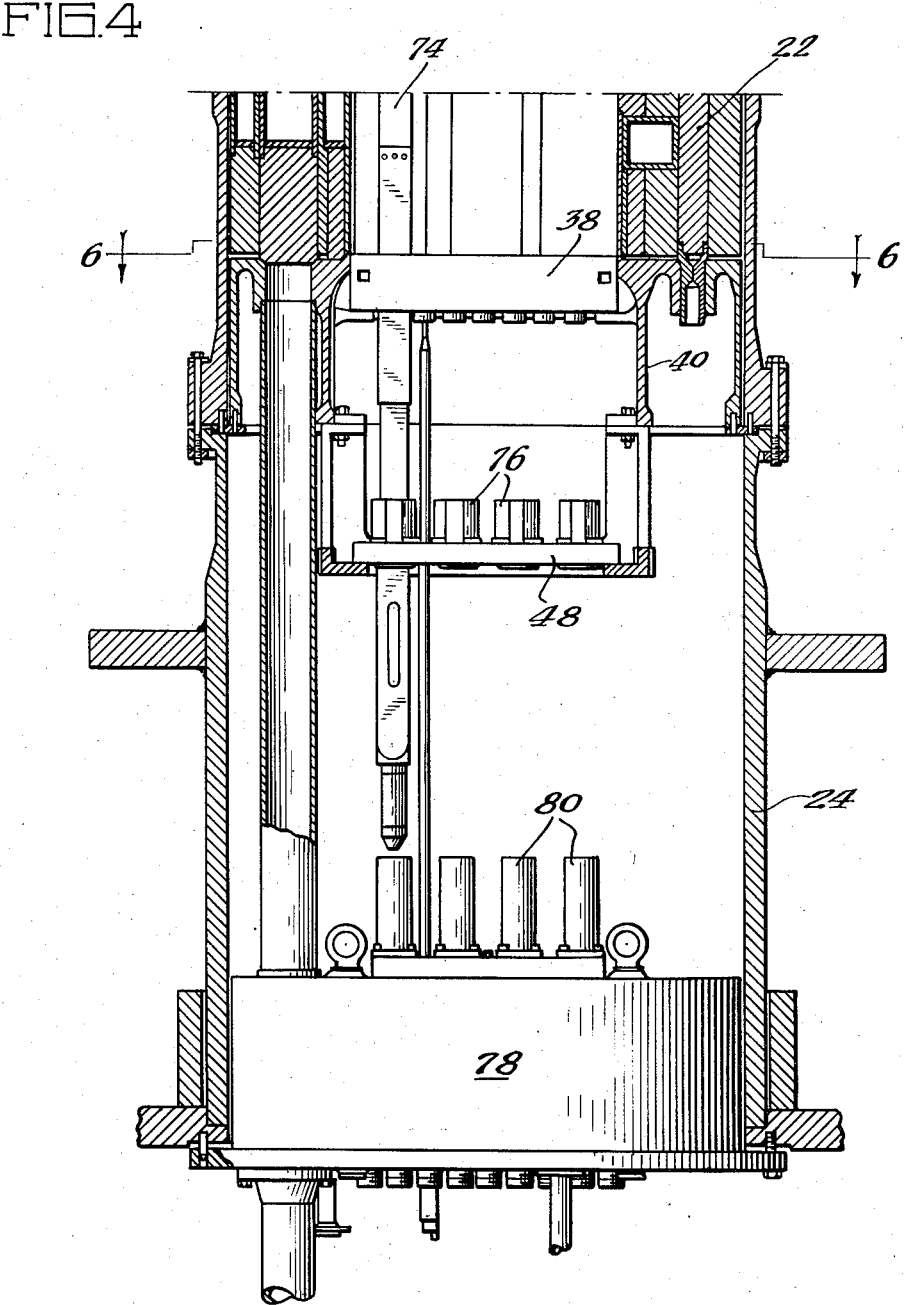

April 22, 1958  E. P. WIGNER  2,831,806
NEUTRONIC REACTOR
Filed Oct. 14, 1952  8 Sheets-Sheet 5
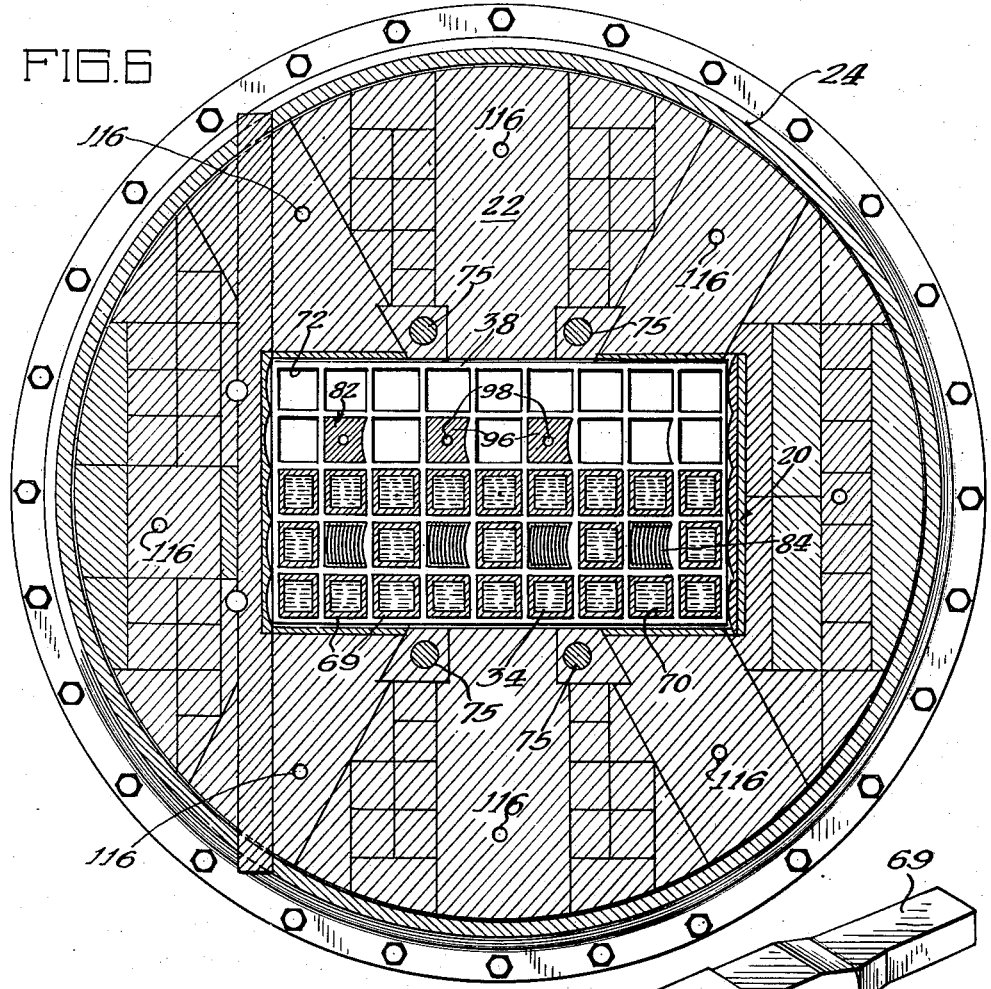
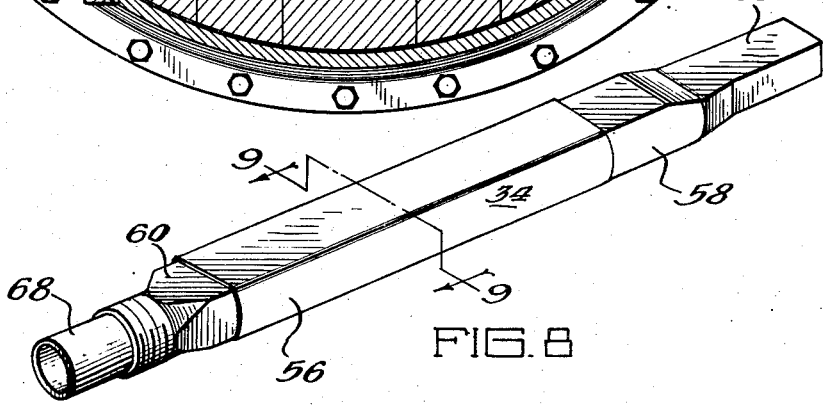
INVENTOR.
Eugene P. Wigner
BY
Roland A. Anderson
Attorney April 22, 1958     E. P. WIGNER     2,831,806
NEUTRONIC REACTOR Filed Oct. 14, 1952     8 Sheets-Sheet 6

INVENTOR.
Eugene P. Wigner
BY
Roland A. Anderson
Attorney

April 22, 1958

E. P. WIGNER 2,831,806

NEUTRONIC REACTOR

Filed Oct. 14, 1952

INVENTOR.
Eugene P. Wigner
BY
Roland A. Anderson
Attorney

April 22, 1958    E. P. WIGNER    2,831,806
NEUTRONIC REACTOR
Filed Oct. 14, 1952    8 Sheets-Sheet 8
FIG.13
FIG.14
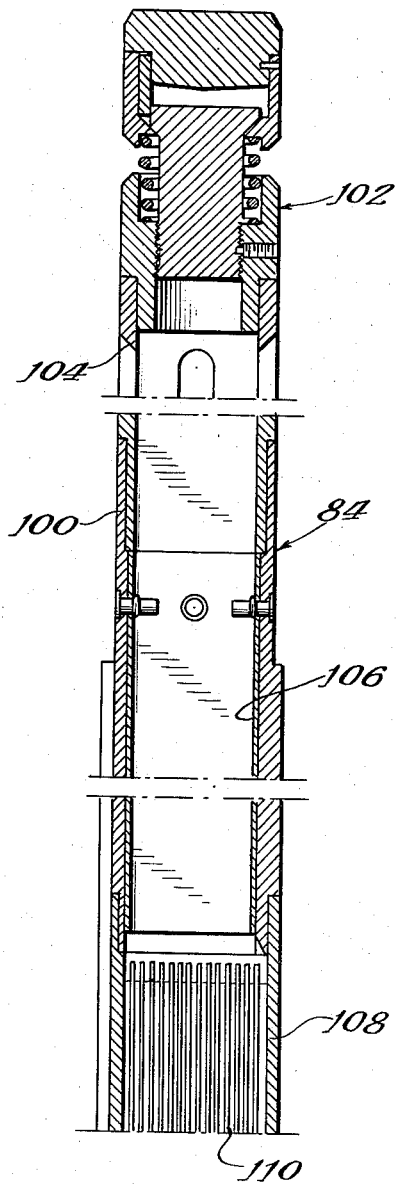
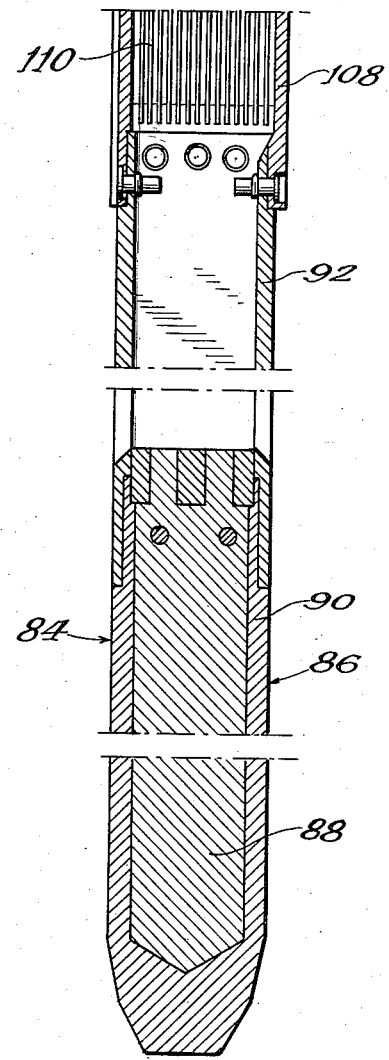
INVENTOR.
Eugene P. Wigner
BY
Roland A. Anderson
Attorney United States Patent Office 2,831,806
Patented Apr. 22, 1958

2,831,806

NEUTRONIC REACTOR

Eugene P. Wigner, Princeton, N. J., assignor to the United States of America as represented by the United States Atomic Energy Commission Application October 14, 1952, Serial No. 314,595

2 Claims. (Cl. 204—193.2)

The present invention relates generally to neutronic reactors, and more particularly to neutronic reactors designed for the irradiation of materials.

One of the uses of neutronic reactors is to irradiate materials with neutrons and other particles and radiations. In this manner, radioactive isotopes may be produced for all chemical elements with the exception of helium. The physical transformation of elements as a result of irradiation in a neutronic reactor may be accomplished through any one of a number of reactions which are fully described in the published literature. Radioactive isotopes produced by neutronic reactors are receiving large commercial interest, particularly such isotopes as $H^3$, $C^{14}$, $P^{32}$, $S^{35}$, and $I^{131}$. As a result, there is a great demand for neutronic reactors which are particularly adapted to produce radioactive isotopes.

The neutrons produced by neutronic reactors may be generally classified in three categories. First, there are virgin neutrons which are those neutrons emitted from the nucleus of an atom of fissionable material which have as yet suffered no collisions with other atoms, and hence possess the energy imparted to them by the fission process. Second, there are the slow, or thermal, neutrons which are neutrons possessing energies approximating the energy imparted by the thermal conditions in which the neutrons exist. Finally, there are epithermal neutrons, which are those neutrons which have suffered collisions with atoms of material but which possess greater than thermal energy.

Radioactive isotopes which are produced by the absorption of neutrons are produced primarily as a result of the absorption of thermal neutrons, rather than neutrons having higher energies. For this reason, a neutronic reactor which is to be used for the production of radioactive isotopes should produce large numbers of thermal neutrons relative to neutrons of higher energy.

For many purposes, it is preferable to subject the materials being irradiated to a thermal neutron flux only, since neutrons of higher energy may produce other effects in the material being irradiated. For example, high energy neutron bombardment is known to displace atoms from the lattice structure of crystalline materials. Hence, it is an object of the present invention to provide a reactor for the production of isotopes which has a region producing substantially only thermal neutron flux.

Also, the inventor has found that it is preferable to construct a neutronic reactor for irradiating materials with a region of maximum thermal neutron flux adjacent to the periphery of the reactor, rather than in the center of the reactor. Materials may be more readily inserted into a region adjacent to the periphery of the reactor than into a region in the center of the reactor. Also, much more space is provided adjacent to the periphery of the reactor for accommodating such materials. Hence, it is a further object of the present invention to provide a neutronic reactor with a maximum thermal neutron flux in a region adjacent to the periphery of the reactor, rather than in a central region of the reactor.

The inventor has found that these objects may be accomplished with a neutronic reactor comprising a core and a reflector. Hence, it is also an object of the present invention to provide a neutronic reactor having a core and a reflector in which the maximum thermal neutron flux in the reflector exceeds the maximum thermal neutron flux in the core of the reactor.

The neutronic reactor described hereafter exhibits the foregoing properties, and hence is particularly desirable for the irradiation of materials. Other properties and advantages of neutronic reactors constructed according to the teachings of the present invention will become readily apparent from a study of the following description of the invention, together with the illustrative embodiment shown in the drawings, in which:

Figure 4 is a vertical sectional view of the remaining portion of the reactor tank shown in Figure 3;

Figure 6 is a horizontal sectional view taken along line 6—6 of Figure 4;

Figure 8 is an isometric view of one of the fuel assemblies of the neutronic reactor;

Figure 13 is a vertical sectional view of a portion of a second type of control element shown generally in Figures 3 through 5; and Figure 14 is a vertical sectional view of the remaining portion of the control element shown in Figure 13.

Figure 1:
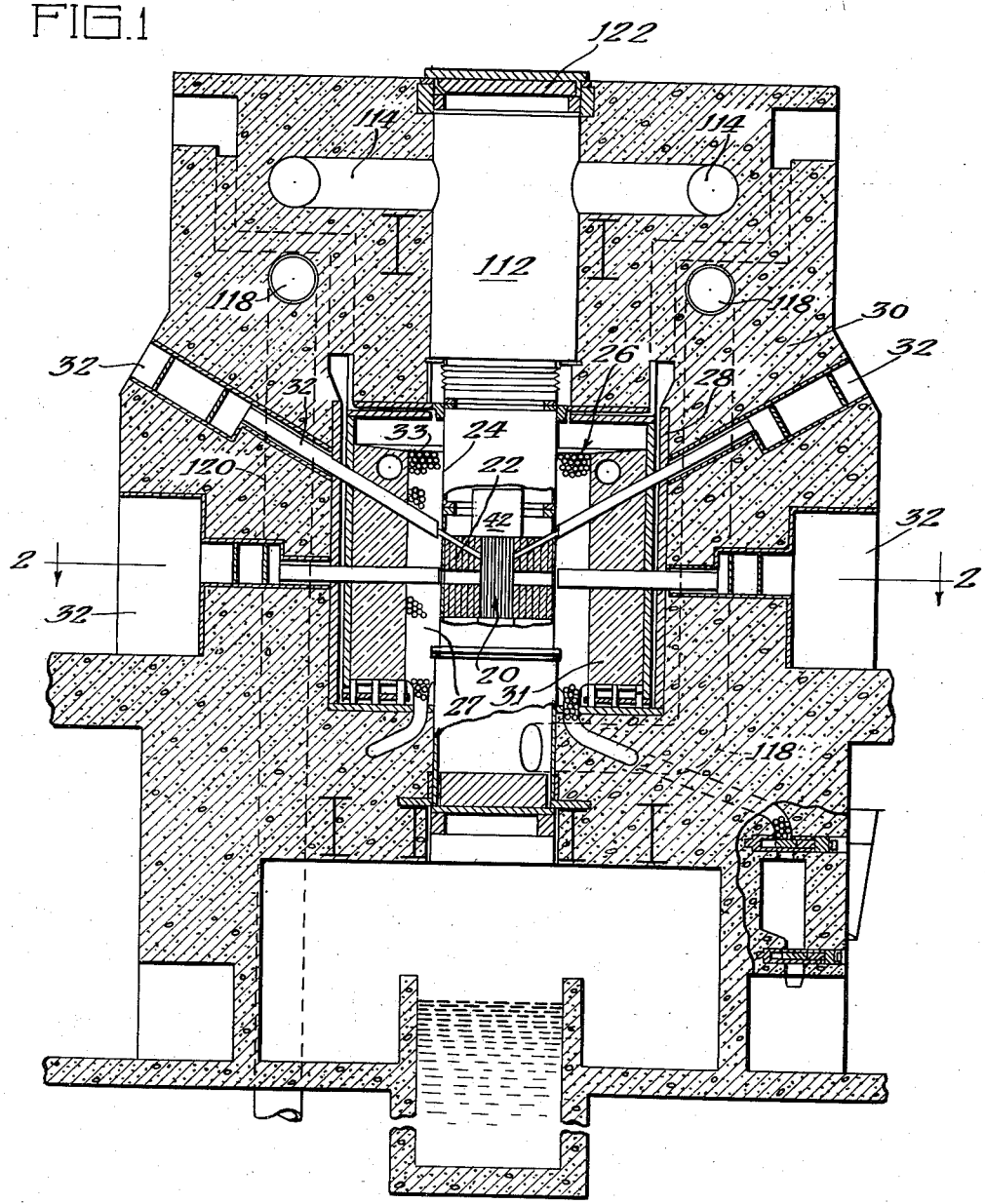
Figure 1 is a vertical sectional view of a neutronic reactor constructed according to the teachings of the present invention.
Figure 2:
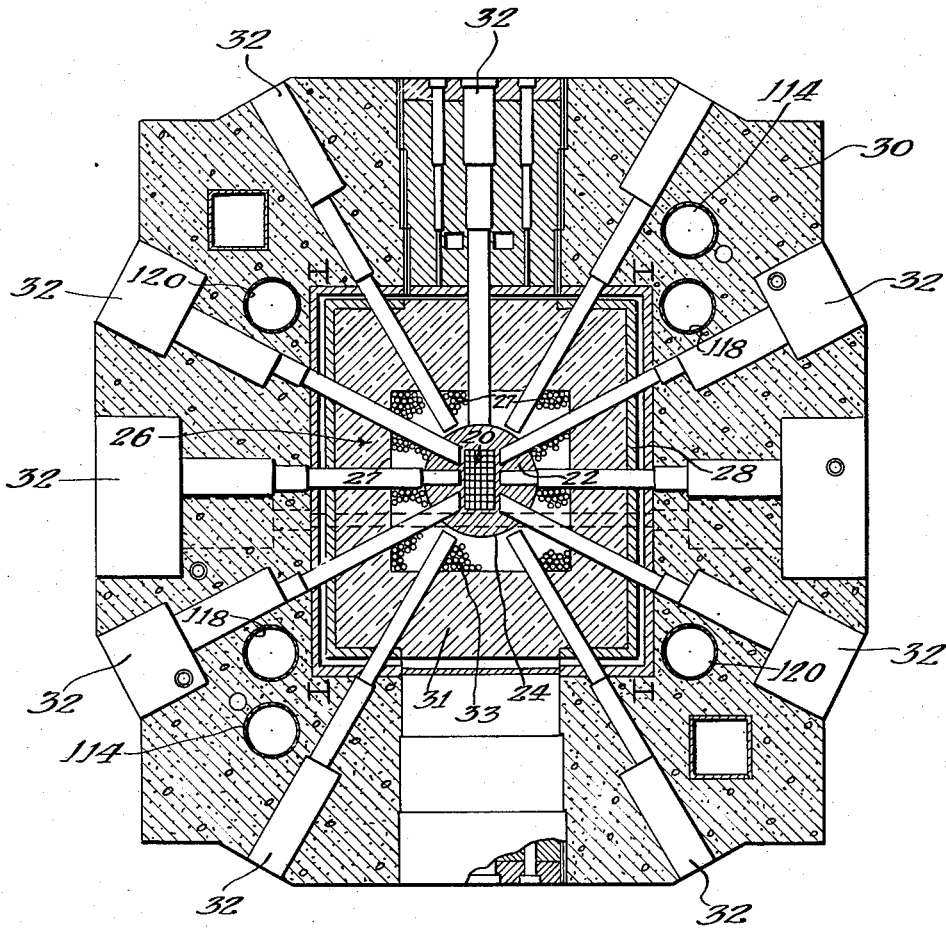
Figure 2 is a horizontal sectional view taken along line 2—2 of Figure 1.
Figure 3:
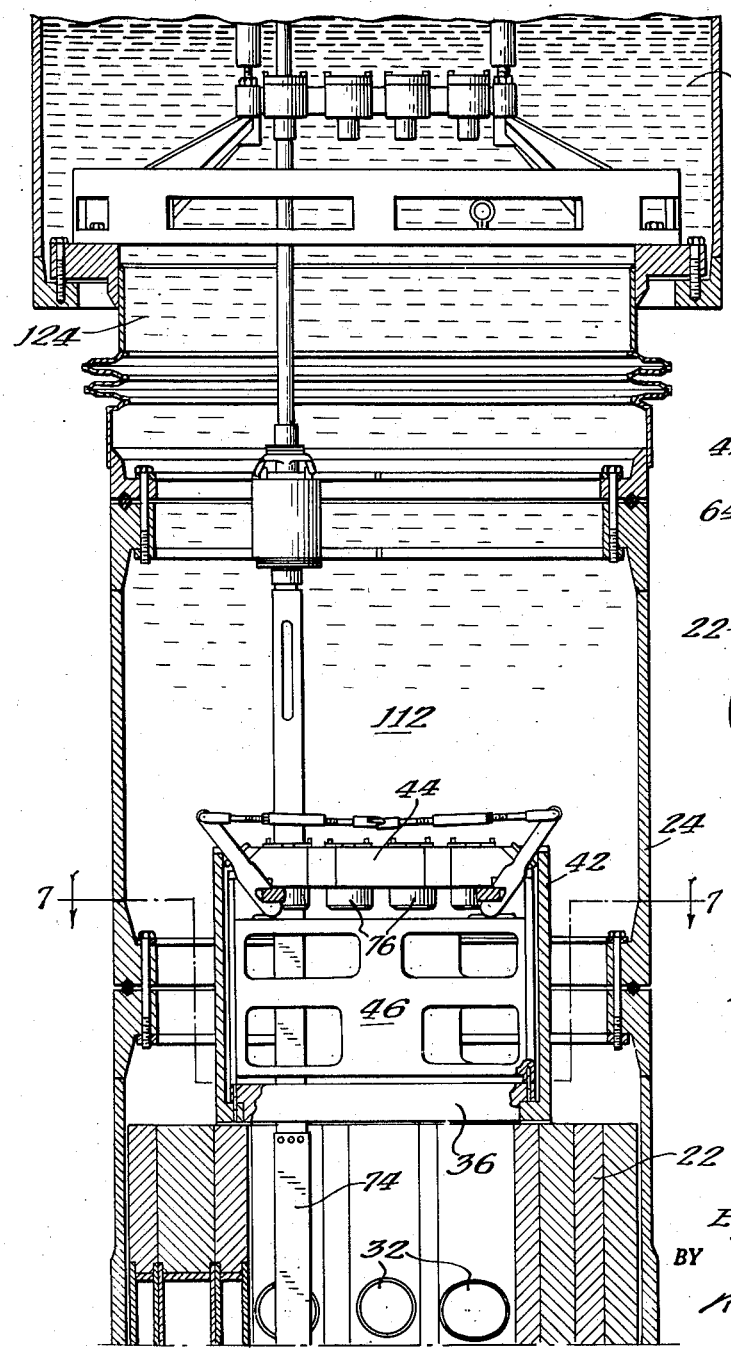
Figure 3 is a vertical sectional view of a portion of the reactor tank shown generally in Figures 1 and 2.
Figure 5:
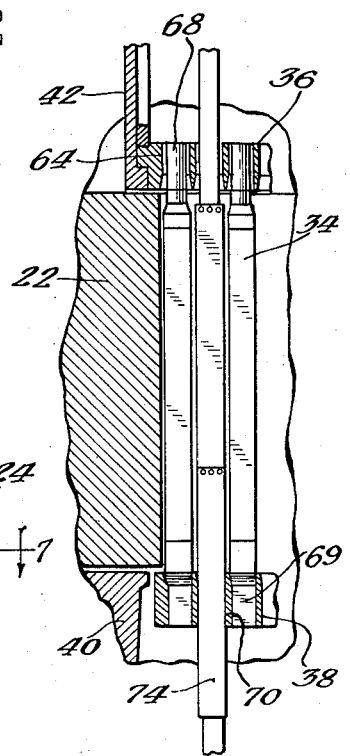
Figure 5 is a fragmentary sectional view of a portion of the core of the reactor shown in Figures 3 and 4.

As shown in Figure 1, the reactor has a core 20 surrounded by a first reflector 22, both the reflector 22 and the core 20 being disposed within a tank 24. A second reflector 26 is disposed about the outer periphery of the tank 24, and a thermal shield 28 surrounds the second reflector 26. A massive additional shield 30 surrounds the thermal shield 28. Figure 1 also shows a number of passages 32 extending through the shield 30, the thermal shield 28, the second reflector 26, and the first reflector 22 to the core 20 of the reactor. These passages are provided to enable operating personnel to position materials which are to be irradiated at a desired position relative to the core 20 of the reactor.

The core 20 of the reactor comprises a plurality of fuel assemblies 34 immersed in a water moderator. The fuel assemblies 34 are supported between an upper assembly grid 36 and a lower assembly grid 38. A lower support member 40 is secured to the tank 24, and secures the lower assembly grid 38. The upper assembly grid 36 is also secured to the tank 24 by an upper support member 42. An upper guide grid 44 rests upon the upper assembly grid 36 by means of a grid spacer 46. A lower guide grid 48 is positioned beneath the lower assembly grid 38 and attached to the tank 24 by the support member 40.

The fuel assemblies 34 are specifically illustrated in

Figure 9:
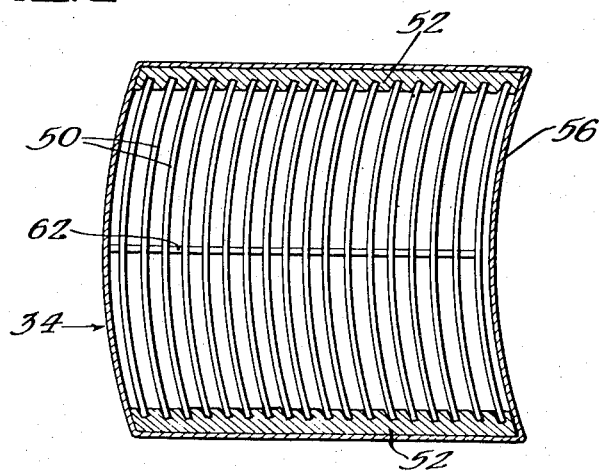
Figure 9 is a transverse sectional view of the fuel assembly taken along line 9—9 of Figure 8.
Figure 10:
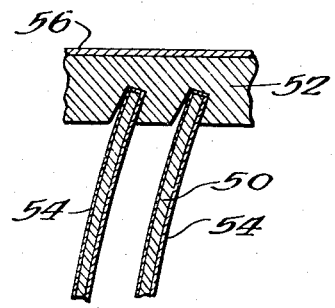
Figure 10 is a fragmentary sectional view of the fuel assembly shown in Figure 9.

Figures 8 through 10. Plates 50 of material fissionable by neutrons of thermal energy are provided with a corrosion resistant cladding 54 and secured to side plates 52. The plates 50 of fissionable material are curved in shape and wrapped within a covering 56. A comb shaped support 62 maintains the plates 50 in rigid spaced relationship. The ends of the covering 56 are secured to end boxes 58 and 60 which permit the fuel assemblies 34 to be secured between the upper and lower assembly grids 36 and 38.

In one particular construction of the neutronic reactor which will be used to illustrate the present invention throughout this description, the plates 50 are constructed of uranium containing 93.5% $U^{235}$ alloyed with aluminum, and the cladding 54 is aluminum. Each fuel assembly 34 contains eighteen plates 50, each plate being approximately 2.8 inches wide and 24⅝ inches long. Each of the plates 50 is 0.06 inch thick and spaced from adjacent plates by 0.118 inch. The end boxes 58 and 60 are constructed of aluminum. Each of the fuel assemblies 34 contains approximately 140 grams of $U^{235}$.

Figure 7:
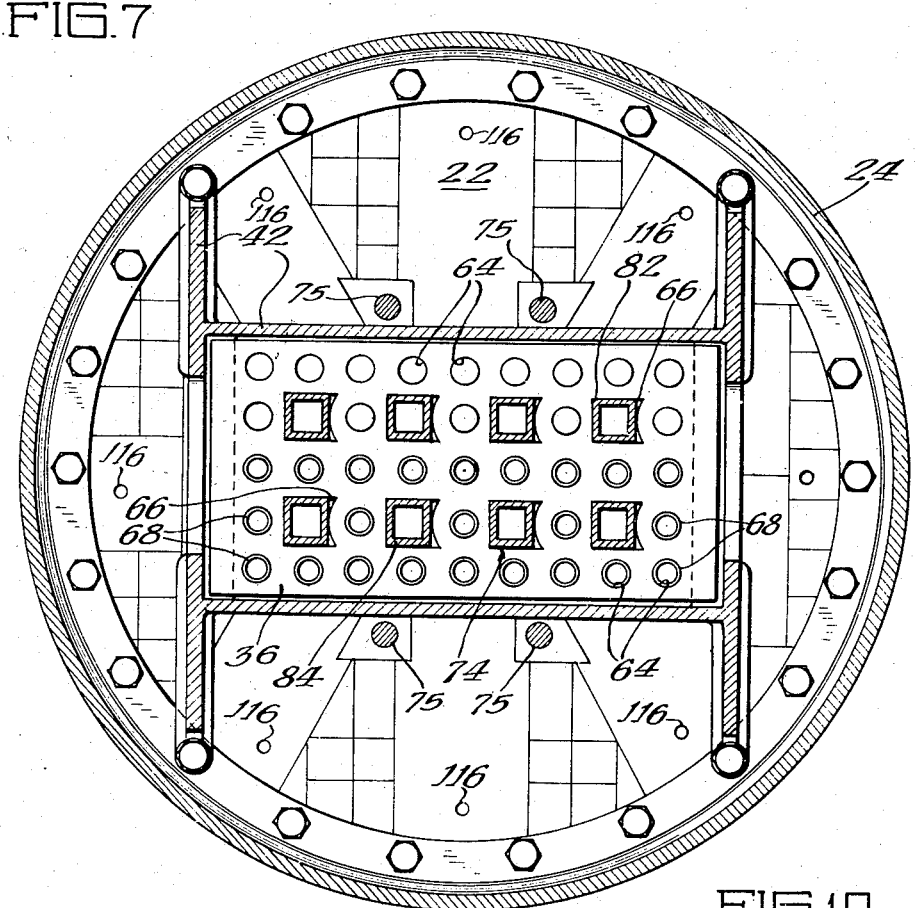
Figure 7 is a horizontal sectional view taken along line 7—7 of Figure 3.

Figure 7 indicates that the upper assembly grid 36 is provided with rows of circular apertures 64, some of the circular apertures 64 being separated by apertures 66 which are essentially rectangular but have a curved side. The end boxes 60 of the fuel assemblies 34 are provided with circular connectors 68 which are adapted to fit into the circular apertures 64 of the upper assembly grid 36. The lower assembly grid 38, illustrated in Figure 6, is provided with rows of rectangular orifices 70, some of the orifices 70 being separated by orifices 72, which are essentially the same shape as the apertures 66 in the upper assembly grid 36. The end boxes 58 of the fuel assemblies 34 have rectangular connectors 69 which snugly fit the rectangular orifices 70 of the lower assembly grid 38, thus securing the fuel assemblies 34 between the upper and lower assembly grids 36 and 38.

The apertures 66 in the upper assembly grid 36 and the orifices 72 in the lower assembly grid 38 are provided for control elements 74 which are slidably disposed within the core 20 of the reactor. The control elements 74 are journaled within bearings 76 in the upper and lower guide grids 44 and 48. A bottom plug 78 at the lower end of the tank 24 supports shock absorbers 80 aligned with the bearings 76 in the upper and lower guide grids 44 and 48 for the purpose of absorbing a portion of the shock caused by the falling control elements 74 when the control elements 74 are rapidly inserted into the reactor.

There are three types of control elements 74 used to control the reactor. The one type, illustrated at 82, is constructed of the same material as the first reflector 22 in a portion of the control element 82 which may be disposed in the core 20 of the reactor. The second type of control element 84 contains a material fissionable by neutrons of thermal energy in a portion which may be disposed in the core 20 of the reactor. Finally, regulating rods 75 containing material having a neutron cross section of at least 100 barns, such as cadmium, are slidably disposed in the first reflector 22.

Figure 11:
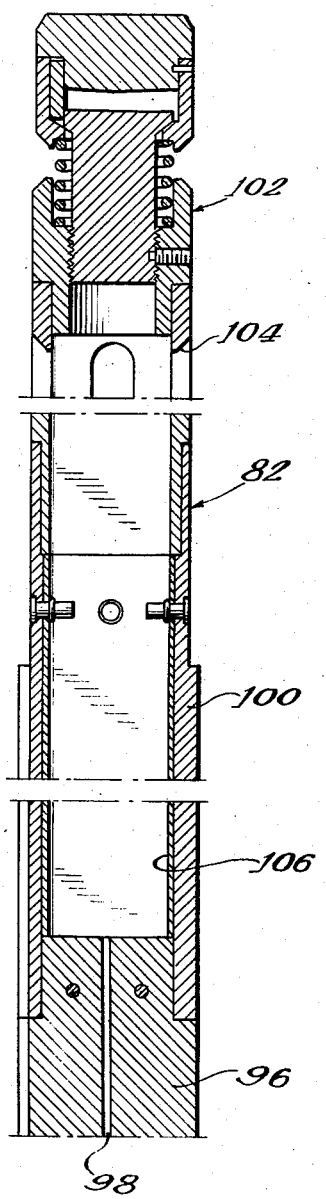
Figure 11 is a sectional view of a portion of one type of control element shown generally in Figures 3 through 5.
Figure 12:
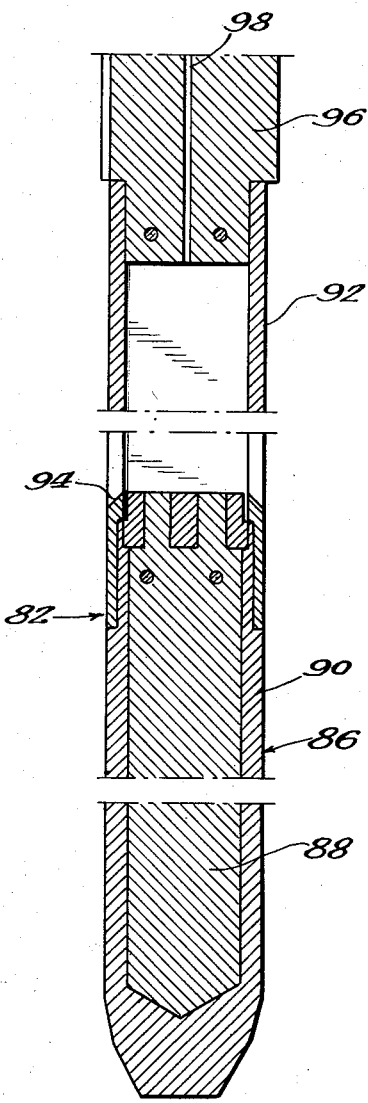
Figure 12 is a sectional view of the remaining portion of the control element shown in Figure 11.

The first type of control element 82, which may be referred to as a reflecting control element, is specifically illustrated in Figures 11 and 12. It is provided with a tip 86 which is constructed of materials which will absorb the shock caused by rapidly inserting the control element 82 into the reactor. A plug 88 of relatively light materials, such as aluminum sheathed in a jacket 90 of durable material, such as iron, provides a tip 86 which will withstand considerable shock. A sleeve 92 is provided with a water outlet aperture 94, and is attached to an element 96 which contains material having neutron reflecting properties approximately the same as those of the first reflector 22. A channel 98 extends centrally through the element 96. A second sleeve 100 is attached to the opposite end of the element 96 and connects the element 96 with a head 102 of the control element 82.

A water inlet aperture 104 is disposed in the sleeve 100, so that water may enter into the sleeve 100, flow through the channel 98, through the sleeve 92 and out of the aperture 94, thus cooling the control element 82. A neutron absorbing liner 106 is also disposed within the sleeve 100. The liner 106 should be constructed of a material having a neutron capture cross section of at least 100 barns.

A control element 84 having a portion containing fissionable material is shown in Figures 13 and 14, and is identical with the control elements 82 containing reflecting material, except for the region between the sleeves 92 and 100, and similar numerical designations have been used on the drawings for the identical elements of the two types of control elements 74. The region between the sleeves 92 and 100 of the fuel containing control elements 84 comprises a tube 108 containing fuel plates 110 similar in design and construction to those fuel plates 50 of the fuel assemblies 34.

As illustrated in Figure 6, the core 20 of the reactor comprises three rows of fuel assemblies 34 and control elements 84, there being a total of 27 fuel assemblies 34 and control elements 84. The fuel plates 110 in the control elements 84 are disposed beneath the neutron absorbing liner 106 in these elements 84, so that the control element 84 may be partially withdrawn from the core 20 of the reactor to place the fuel plates 110 in the core 20 of the reactor. In this manner, a maximum of 27 fuel sections may be disposed in the active portion of the reactor. However, when a control element 84 is lowered, the neutron absorbing liner 106 is at least partially disposed within the core 20 of the reactor, thereby at least partially removing the fuel plates 110 and reducing the reactivity of the core 20 of the reactor.

The control elements 82 which contain neutron reflecting material are disposed adjacent to the rows of fuel assemblies 34, and when partially raised, dispose reflecting elements 96 adjacent to the core 20 of the reactor, as illustrated in Figures 6 and 7. In this position, the reflecting elements 96 contribute to the total neutron reflection of the first reflector 22, and add to the reactivity of the core 20 of the reactor. However, if the control elements 82 are lowered into contact with the shock absorbers 80, then the neutron absorbing liners 106 are disposed adjacent to the fuel assemblies 34, and the reactivity of the core of the reactor is reduced.

The neutronic reactor is both cooled and moderated by the same flow of water. The tank 24 is provided with a reservoir portion 112 above the core 20 of the reactor. Coolant pipes 114 are connected to the reservoir portion 112 of the tank 24 and introduce the water coolant into the reservoir portion 112 of the tank 24. The water coolant then flows downward through the fuel assemblies 34 and the control elements 74 of the core 20 of the reactor, and also through channels 116 in the first reflector 22. Return pipes 118 adjacent to the bottom of the tank 24 return the coolant upwardly through the shield 30. The water is then recirculated downwardly through another portion of the shield 30 through coolant exit pipes 120 disposed in the shield 30. In this manner, the core 20 of the reactor, the first reflector 22 and the shield 30 are cooled.

The top of the tank 24 is provided with a cover 122 which is removed when fuel assemblies 34 are to be removed or mounted between the upper and lower assembly grids 36 and 38. Upper guide grid 44 and the upper assembly grid 36 are both removed, and the end boxes 58 of fuel assemblies 34 are inserted into the rectangular orifices 70 of the lower assembly grid 38. The upper assembly grid 36 is then replaced in the upper grid support member 42, the end boxes 60 of the fuel assemblies 34 being disposed within the circular apertures 64 in the upper assembly grid 36. A number of control elements 74 are also disposed within the core 20 of the reactor in order to prevent the core from becoming critical. However, there is less danger of the core becoming critical during charging operations than might be anticipated due to the fact that the moderator has been removed from the core 20 during this step, the water coolant having been removed from the reactor. With the control elements 74 and the fuel assemblies 34 positioned in the core 20, the upper guide grid 44 is replaced in the upper grid support member 42, and the cover 122 replaced upon the reactor. The water coolant may then be circulated through the reactor, forming a pool 124 above the core 20 of the reactor extending to the cover 122. This pool 124 of water forms a shield for the upper portion of the reactor.

As stated above, this reactor has the unusual property of having a higher thermal neutron flux in the reflector 22 than in the core 20 of the reactor. For purposes of this description, the core 20 of the reactor has been defined as that portion of the neutronic reactor in which fission neutrons originate, and the reflector may be defined as a body of neutron moderating materials positioned adjacent to the core of the reactor. In order to have an accumulation of thermal neutrons in the reflector of a reactor which exceeds the maximum thermal neutron flux in the core of the reactor, certain limitations must be placed upon the construction of the reactor. In the first place, it is clear that the absorption of neutrons in the reflector of the reactor must be relatively small, and also that the absorption of neutrons in the core of the reactor must be relatively high. Hence, not all neutron reflecting, or moderating, materials may be used in the reflector of the reactor, nor can all types of core constructions be utilized. It has been found that the maximum thermal neutron flux in the reflector of the reactor will exceed the maximum thermal neutron flux in the core when the ratio of the neutron scattering cross section to neutron absorption cross section averaged over all of the materials in the reflector is approximately twice the ratio of the neutron scattering cross section to neutron absorption cross section averaged over all of the materials in the core of the reactor, and that the former ratio is preferably in the neighborhood of 10 times the latter ratio for such a reactor.

It is also necessary that the reflector be of sufficient thickness to reflect a large proportion of the neutrons back into the core of the reactor. In the particular embodiment of the reactor shown in the figures, a first reflector 22 constructed of beryllium, is disposed immediately adjacent to the core 20 of the reactor, and a second reflector 26 constructed of graphite is disposed about the beryllium reflector 22. The graphite reflector 26 is constructed with a region 27 nearest to the core 20 of the reactor consisting of small balls 33 of graphite. This region 27 is disposed in a relatively high flux portion of the reactor, and considerable distortion of the graphite in this region would normally be anticipated due to the Wigner effect. The second reflector 26 also includes a region 31 of solid graphite, but since the region 31 is more remote from the core 20 of the reactor, distortion of this region due to the Wigner effect will be less pronounced. In the reactor disclosed, the first reflector 22 is constructed of beryllium and is in the form of a cylinder approximately 54 inches in diameter and 40 inches in height. A channel for the core 20 of approximately 18 inches by 30 inches extends longitudinally through the cylindrical first reflector 22. Also, the coolant water flowing through the reflector 22 contributes to the effectiveness of the reflector 22, and constitutes approximately 2% of the volume of the beryllium. The second reflector 26 has overall dimensions of 12 feet by 14 feet by 9 feet 4 inches, a minimum of 40 centimeters immediately adjacent to the tank 24 being the region 27 containing the balls 33 of graphite.

However, the reflector for a reactor having a greater maximum thermal neutron flux in the reflector than in the core need only be adjacent to the side of the core in which the thermal neutron peak is desired, and it has been found that a reflector of 30 centimeters is adequate when constructed of heavy water or beryllium. Also, combinations of heavy water and graphite or beryllium and graphite may be used, where the beryllium or heavy water is adjacent to the core of the reactor. Other materials reflecting neutrons as effectively as these materials may obviously be used.

In order to have an accumulation of thermal neutrons in the reflector, it is also necessary that the core of the reactor have one overall dimension which is not more than one-half of the other overall dimensions of the core, and preferably not more than one-fifth of the other dimensions. The term "overall" dimension is used here to refer to the total region in which virgin neutrons are produced, or in other words the boundaries of the region containing fissionable material. In the particular reactor described to illustrate the present invention, the overall dimensions of the core of the reactor are approximately 22.5 centimeters × 71 centimeters × 66 centimeters, thus clearly meeting this requirement. It is also to be noted that the core of this reactor is in the form of a thin slab, which is believed to be the optimum geometry for a reactor achieving these desired results.

It is clear from the foregoing discussion, that the construction of a neutronic reactor having a maximum thermal neutron flux in the reflector greater than the maximum thermal neutron flux in the core of the reactor requires the reactor to have a higher neutron reproduction factor, K, than a spherical reactor. It has been found, that neutronic reactors with a neutron reproduction factor less than 1.3 cannot be made to attain criticality while exhibiting a higher maximum thermal neutron flux in the reflector of the reactor than in the core thereof.

It has been found that a reactor with 1.35 kilograms of $U^{235}$ disposed in a rectangular core 51 centimeters × 11 centimeters × 66 centimeters with a thirty-centimeter beryllium reflector constructed with aluminum structural material and water moderated, the volume ratio of aluminum to water being 0.65, is critical and exhibits the desired property of having a higher maximum thermal neutron flux in the reflector than in the core. Also, a cylindrical reactor constructed in this manner with a core 23 centimeters in diameter and 53.4 centimeters high with a K of 1.606 has been found to be satisfactory. In such reactors, the maximum thermal neutron flux in the reflector may be approximately 1.5 times the maximum thermal neutron flux in the core of the reactor.

It is possible to determine whether a particular neutronic reactor will exhibit the property of having a higher maximum thermal neutrol flux in the reflector than in the core by means of the equation $$N = \frac{M^2_{ref}}{M^2_c} \times K$$

where N is a number which will be referred to as the "neutron distribution factor" of the reactor, K is the neutron reproduction factor for the reactor, $M^2_{ref}$ is the migration area for neutrons in the reflector of the reactor, and $M^2_c$ is the migration area for neutrons in the core of the reactor. It has been found that for values of N in excess of 9, the maximum thermal neutron flux in the reflector of the reactor will exceed the maximum thermal neutron flux in the core of the reactor.

In the particular embodiment of the present invention described in the drawings, the core had overall dimensions of 22.5 centimeters × 66 centimeters × 71 centimeters and contained approximately 3.95 kilograms of $U^{235}$ disposed in 27 fuel assemblies 34 and control elements 84. The water coolant served both as a moderator and as a coolant. Also, the ratio of aluminum to water by volume was 0.65, aluminum being the only important structural material in the core of the reactor and acting as a part of the moderator.

From the foregoing description, it will be readily apparent to the man skilled in the art that the reactor disclosed satisfies the objects of this invention. Further, the foregoing disclosure, especially in the light of the disclosure of nuclear reactors and theory in the patent of Fermi and Szilard, No. 2,708,656, filed December 19, 1944, will enable the man skilled in the art to construct many neutronic reactors other than the one specifically illustrated, in which the maximum thermal neutron flux in the reflector of the reactor exceeds the maximum thermal neutron flux in the core of the reactor. For this reason, it is intended that the scope of the present invention be not limited by the foregoing description, but only by the appended claims.

What is claimed is:

1. A neutronic reactor comprising, in combination, a core having overall dimensions of at least 11 centimeters × 51 centimeters × 66 centimeters, one of said dimensions being less than one-half of any one of the other dimensions, said core consisting of at least 1.35 kilograms of $U^{235}$, aluminum and water, the ratio of aluminum to water being not more than 0.65 by volume, and a reflector constructed of beryllium adjacent to said core and surrounding said core for at least 30 centimeters, whereby a neutronic chain reaction within the reactor results in a higher thermal neutron flux in the reflector of the reactor than in the core thereof.

2. A neutronic reactor comprising, in combination, a core comprising an upper grid having at least 27 apertures arranged in 3 rows, said apertures being spaced from each other by approximately 3 inches between centers, a lower grid spaced parallel to the upper grid, said grid having an orifice confronting each of the apertures of the upper grid, 23 elongated fuel assemblies inserted in the orifices and apertures in the grids, each of said assemblies containing approximately 140 grams of $U^{235}$ distributed over a length of approximately 24½ inches, said fuel assemblies comprising a plurality of plates including the $U^{235}$, said plates being provided with a corrosion resistant cladding and being spaced from each other, a pair of side plates sealed to opposite sides of the $U^{235}$ plates forming closed channels between the $U^{235}$ plates, and a pair of end boxes sealed to the plates of $U^{235}$ and the side plates, one end box in each assembly being disposed in the upper grid aperture and the other end box being disposed in the confronting orifice in the lower grid, 4 control elements slidably disposed through the middle row of orifices and apertures in the upper and lower grids and spaced between fuel assemblies in said row, said elements having portions containing approximately 140 grams of $U^{235}$ distributed over a length of approximately 24½ inches and adjacent portions containing material having a neutron capture cross section of at least 100 barns, means to flow water between the fuel assemblies and control elements and through the channels within the fuel assemblies; a reflector disposed about the core, said reflector including a portion containing beryllium and not more than 2% water extending for approximately 30 centimeters from the core of the reactor, and a portion containing graphite extending for at least an additional 25 centimeters from the core of the reactor; and a shield for absorbing neutrons and radiations disposed about the reflector, whereby a neutronic chain reaction in the reactor results in a higher thermal neutron flux in the reflector of the reactor than in the core of the reactor.

References Cited in the file of this patent

Mon P-357, U. S. Atomic Energy Comm., by M. M. Mann et al., Aug. 18, 1947, Clinton Labs. (21 pages).

ANL-4551, U. S. Atomic Energy Comm., by R. K. Winkleback, Dec. 29, 1949, Argonne National Laboratory (39 pages) (rely particularly on pp. 5, 6, 8–10, 27, 28, 30–33).

Atomics, vol. 6, No. 6 November-December 1950, pages 10–15.

U. S. Atomic Energy Comm. AECD 3435, A Low Cost Experimental Neutron Chain Reactor, Part I, by William M. Breazeale, Oak Ridge National Laboratory, Apr. 12, 1952 (date declassified Aug. 13, 1952), pages 1–29.

Atomics, May 1952, pp. 126–129 and 131 (an article entitled "Norwegian Heavy-Water Pile").

Nucleonics, November 1952, Breazeale, pages 56–60.

The Elements of Nuclear Reactor Theory, by Samuel Glasstone and M. C. Edlund; D. Van Nostrand Co., New York, 1952, pages 225, 226, 238, 239, 247.